E. T. NICKLIN.
MACHINE FOR SPLITTING PIGS' FEET.
APPLICATION FILED JULY 14, 1915.
1,177,534.
Patented Mar. 28, 1916.
2 SHEETS—SHEET 1.
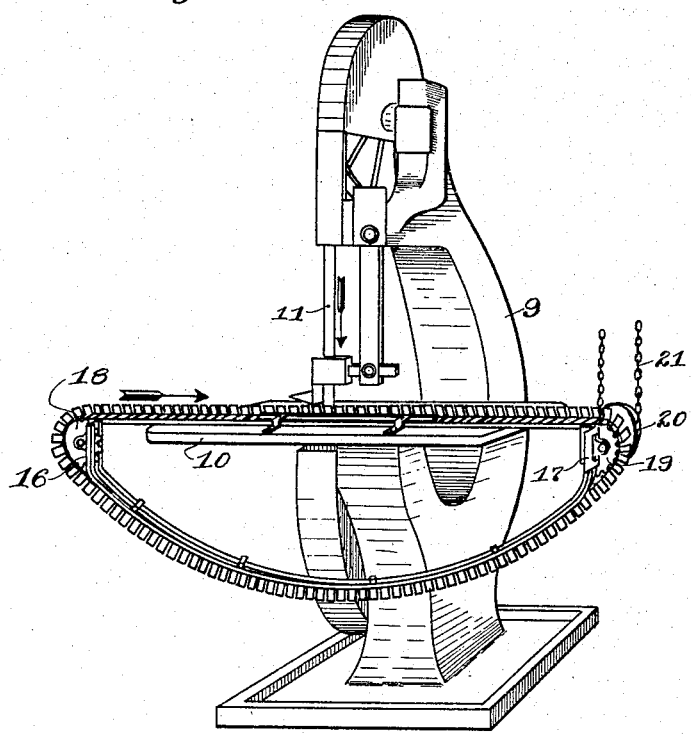
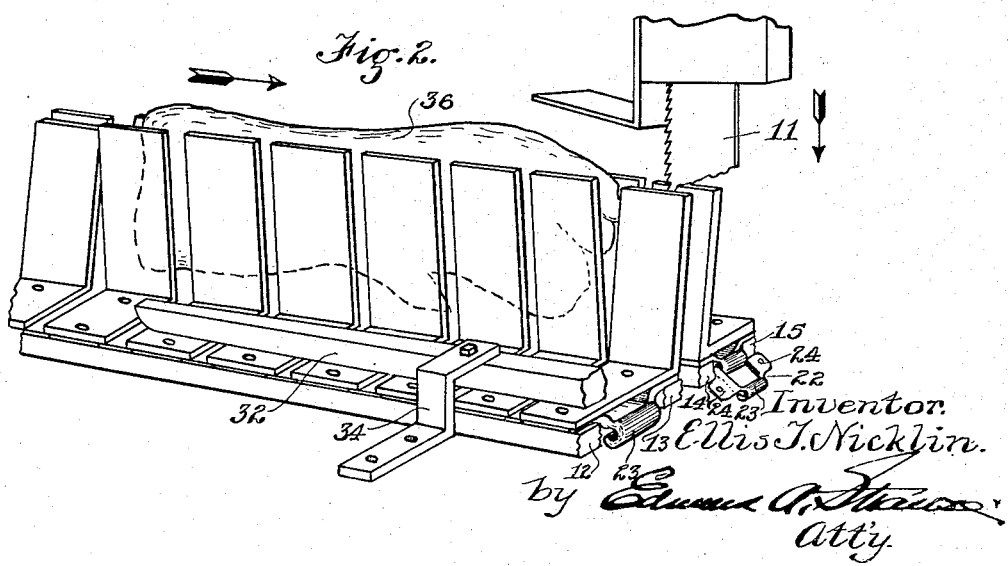

E. T. NICKLIN.
MACHINE FOR SPLITTING PIGS' FEET.
APPLICATION FILED JULY 14, 1915.
1,177,534.
Patented Mar. 28, 1916.
2 SHEETS—SHEET 2.
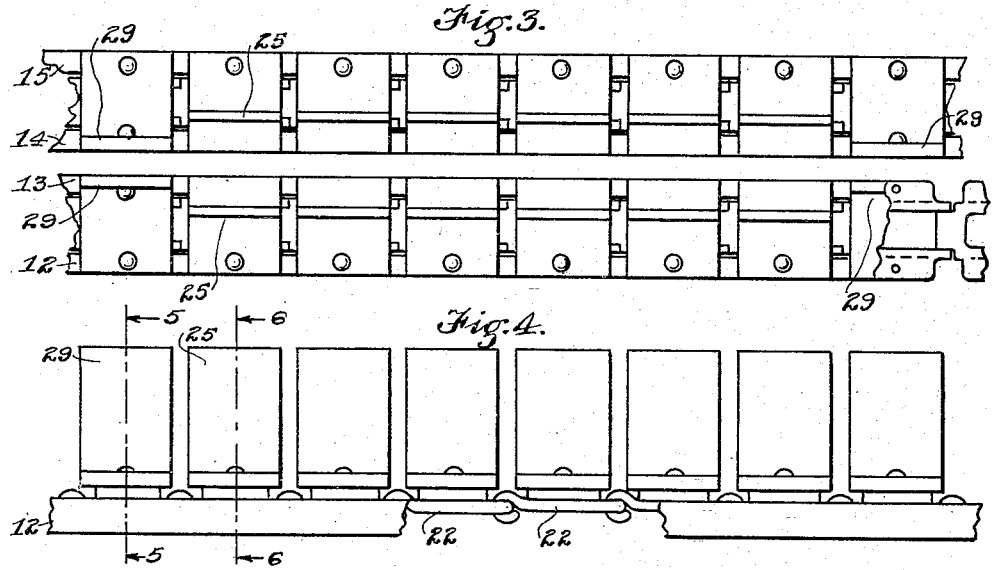
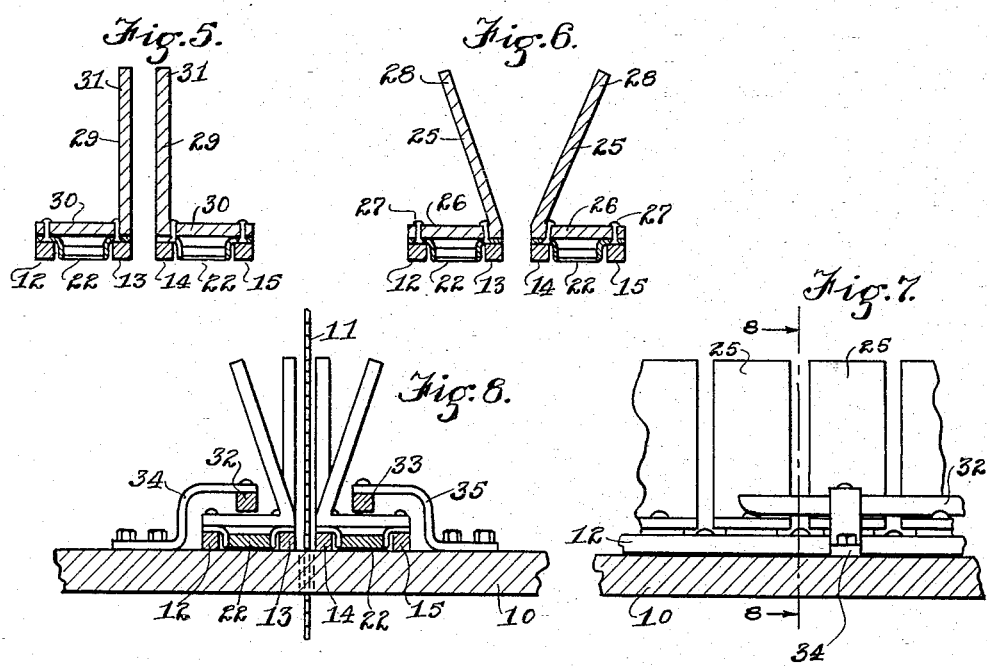
Inventor
Ellis T. Nicklin
by Edmund A. Strauss
Atty.

UNITED STATES PATENT OFFICE.

ELLIS T. NICKLIN, OF LOS ANGELES, CALIFORNIA, ASSIGNOR TO CUDAHY PACKING COMPANY, OF CHICAGO, ILLINOIS, A CORPORATION OF ILLINOIS.

MACHINE FOR SPLITTING PIGS' FEET.

1,177,534.  Specification of Letters Patent.  Patented Mar. 28, 1916.

Application filed July 14, 1915. Serial No. 39,801.

*To all whom it may concern:*

Be it known that I, ELLIS T. NICKLIN, a citizen of the United States, residing at Los Angeles, in the county of Los Angeles and State of California, have invented new and useful Improvements in Machines for Splitting Pigs' Feet, of which the following is a specification.

This invention relates to a machine for splitting pigs' feet, and relates especially to a sawing machine, which is provided with a conveyer for feeding pigs' feet to the saw.

It is an object of this invention to provide a sawing machine for pigs' feet or like objects which will split the foot from end to end without tearing or mashing the foot and which will not throw the meat and bone sawdust into the receptacle which receives the split feet, and which will saw the foot with a minimum amount of waste.

It is the common practice to cook pigs' feet and then split them. Machines have been devised which comprise an endless wheel conveyer with a buzz saw which is disposed adjacent the periphery of the conveyer. Such devices have the disadvantage that the saw must be of considerable thickness in order to be selfsustaining, and due to the thickness of the saw a great waste is occasioned. The periphery of the saw and the periphery of the conveyer at the points where they are contiguous move in the same direction and there is a tendency to jam the foot and smash it. The foot is also grasped by the saw, split and thrown out from the conveyer wheel, the meat and bone dust or snow and the pigs' feet being thrown in the same direction into a receiving receptacle.

I obviate the above described disadvantages by means of the structure illustrated in the accompanying drawings, in which:

Figure 1 is a perspective view of my sawing machine. Fig. 2 is an enlarged fragmentary perspective detail view of my sawing machine. Fig. 3 is a fragmentary plan view of a conveyer detail. Fig. 4 is a fragmentary elevation of the conveyer shown in Fig. 1. Fig. 5 is a vertical section taken on the line 5—5 of Fig. 4. Fig. 6 is a vertical section taken on the line 6—6 of Fig. 4. Fig. 7 is a fragmentary detail view in elevation of the conveyer and guide track. Fig. 8 is a section taken on the line 8—8 of Fig. 7.

More specifically, 9 indicates the frame of a band saw of the usual type which is provided with a work supporting table 10 and a saw band 11. As the band saw structure is of the usual form and the detail structure may be varied, I have not described the detail construction of the saw structure illustrated in the drawing.

My invention resides primarily in the conveyer mechanism in combination with the saw. Mounted upon the table 10 are parallel spaced tracks 12, 13, 14 and 15 adapted to receive between their spaces the links and pins of a conveyer chain. The tracks 12, 13, 14 and 15 overhang the edges of the table, are bent downwardly in a vertical direction and then in the arc of a circle to complete an endless track. Upon the vertical portions are mounted brackets 16 and 17 which are provided with bearings for sprocket wheels. Sprocket wheel 18 is idle while sprocket wheel 19 is mounted upon the shaft which is provided with a drive pulley 20 having a sheave adapted to receive a drive chain 21. The conveyer chains are comprised of attachment links 22 which have barrels 23 for receiving pins and flanges 24 for attaching positioning arms. The positioning arms are comprised of angle members 25, the legs of which are bent at an acute angle, one leg being secured by rivets 27 or any other suitable means to the attaching flanges 24 of the chain links. The upstanding arms 28 are arranged to form a receiving space for the pigs' feet, the space having walls tapering downwardly toward each other.

At selected intervals stop arms 29 are secured to the chains. Stop arms 29 are formed of angle members whose legs 30 and 31 are substantially at right angles to each other, one leg being secured to the attaching flanges 24 of a link.

To prevent the positioning and stop arms from rocking toward each other, and thereby disposing the arms 31 and 28 in such a position that they would come in contact with the saw band 11, I have provided holding tracks 32 and 33 which are disposed above the legs 26 and 30 of the positioning stop arms and are secured in place by means of brackets 34 and 35 which are attached to the table 10 by means of bolts or any other suitable means. Holding tracks 32 and 33 serve to maintain the positioning and stop arms in upright position.

In the use of my improved sawing machine, pigs' feet 36 are fed into the conveyer at one end, each foot being of such length that it will lie between two groups of stop arms. As the conveyer moves a foot toward the saw as indicated by the arrow, the foot is forced thereagainst and also against the rear stop arms. The saw then splits the foot as it is moved forward, the saw passing between the spaced conveyer chains. The saw band moves in a direction indicated by the arrow and carries the meat and bone saw dust downward. The foot in its split condition is carried forward to the end of the horizontal portion of the track where it drops off and may be received in any suitable receptacle.

It will be noted that the direction of movement of the saw is such that there is no tendency to pull the foot forward, and that the speeds of movement against the saw and of the saw itself may be so regulated as to give a clean cut. The gage of the saw band 11 is not limited as to thickness by any selfsustaining feature as in the case of the buzz saw.

What I claim is:

1. In a sawing machine, the combination of an endless conveyer comprised of spaced chains, angle members secured thereto having upstanding legs inclined to each other and other angle members with their legs forming stops for the material to be sawed, and a saw disposed between said chain and substantially at right angles thereto.

2. In a sawing machine, the combination of an endless conveyer, comprised of spaced chains, angle members secured to said chains having upstanding legs forming positioning members, other angle members secured to said chains having upstanding legs forming stops for the material to be sawed, holding tracks disposed above the other legs of said positioning members and stops, and a saw disposed between said chains and substantially at right angles thereto.

3. In a sawing machine, the combination of an endless conveyer, comprised of spaced chains, angle members secured to said chains having upstanding legs forming positioning members, other angle members having upstanding legs forming stops for the material to be sawed, guide tracks positioned below the other legs of said positioning members and stops, holding tracks disposed above said last named legs, and a saw disposed between said chains and substantially at right angles thereto.

In witness that I claim the foregoing I have hereunto subscribed my name this 16th day of June, 1915.

ELLIS T. NICKLIN.

Copies of this patent may be obtained for five cents each, by addressing the "Commissioner of Patents, Washington, D. C."